United States Patent [19]

Nelson et al.

[11] 3,837,948

[45] Sept. 24, 1974

[54] METHOD OF FORMING ADHESIVELY BONDED RAIL JOINT

[75] Inventors: Alfred Dwayne Nelson, Stillwater; Garold L. Goken, Birchwood, both of Minn.

[73] Assignee: Minnesota Mining & Manufacturing Company, St. Paul, Minn.

[22] Filed: May 22, 1972

[21] Appl. No.: 255,613

[52] U.S. Cl.................. 156/71, 156/304, 238/152, 238/227, 238/243
[51] Int. Cl............................................ B32b 31/20
[58] Field of Search .......... 238/151, 152, 243, 227; 156/71, 304

[56] References Cited
UNITED STATES PATENTS

| | | | |
|---|---|---|---|
| 3,139,364 | 6/1964 | Fiechter | 156/71 |
| 3,525,472 | 8/1970 | Sato | 238/243 X |

Primary Examiner—Edward G. Whitby
Attorney, Agent, or Firm—Alexander, Sell, Steldt & DeLaHunt

[57] ABSTRACT

Method of forming adhesively bonded rail joint which is quick to assemble and easy to dismantle and reassemble. The face of each joint bar of the rail joint has a layer of thermoplastic adhesive which upon moderate heating adheres strongly under moderate pressure to conforming surfaces of the rail ends. Because the thermoplastic adhesive does not cure, the joint bars are easily separated from the rails by reheating the adhesive and can be reapplied or used as part of a new rail joint.

2 Claims, 3 Drawing Figures

PATENTED SEP 24 1974 3,837,948

METHOD OF FORMING ADHESIVELY BONDED RAIL JOINT

FIELD OF THE INVENTION

The present invention concerns rail joints, specifically adhesively bonded rail joints, and is particularly concerned with electrically insulating rail joints.

BACKGROUND OF THE INVENTION

Railroad rails are commonly bolted together with a pair of fishplates or joint bars in a manner allowing considerable vertical movement of the rails relative to each other. As each train wheel leaves one rail, it depresses that rail relative to the other and then batters the other rail. After a time, it becomes necessary to repair the battered end of the rail or to replace the rail.

This problem has been partially overcome by welding the rails together, but welded track involves additional problems arising from huge expansion and contraction forces in long sections of welded track with changes in temperature. Also, it is expensive to replace individual rails of welded track. At electrically insulated joints of welded track, the same problem of rail-end batter is involved.

In an effort to reduce rail end batter, some railroads have been experimenting with adhesively bonded rail joints in order to inhibit vertical movement of the rail ends with respect to each other. However, such adhesively bonded rail joints have created a new set of problems. Adhesives which have thus far been used cure rather slowly and require that the line be kept out of service for unduly long periods of time. Then the joint bars become so strongly bonded to the rail that the joint is difficult to dismantle if maintenance is required.

DESCRIPTION OF THE PRIOR ART

U.S. Pat. No. 3,100,080 (Fiechter) shows a rail joint wherein the joint bars are adhered to the rail ends by a thermosetting resin composition, preferably an epoxy resin composition. Since the resin composition extends over the whole area between the joint bars and the rail ends and also surrounds the bolts and the space between the rail ends, this joint might be electrically insulating, although the patent does not mention this.

U.S. Pat. No. 3,139,364 (Fiechter) discloses the same rail joint and adds disclosure showing how to make such a rail joint either electrically conducting or insulating.

"Railway Age", June 14, 1971, pages 48-9, reports a number of field installations of adhesively bonded rail joints. See also "Der Eisenbahningenieur", Vol. 13, No. 3, March 1962.

Orgotherm Inc. of Chicago has imported a "glued insulated rail joint" from Th. Goldschmidt A.G./Electro-Thermit G.m.b.H., Essen, Germany. In making this rail joint, a polyvinyl chloride paste is first applied only to the rail end faces and/or both sides of the end post, and two-part, coldsetting synthetic resin is then applied over the fishing surfaces.

THE PRESENT INVENTION

The present invention concerns an adhesively bonded rail joint which provides advantages of welded track while avoiding its primary disadvantages and without introducing new disadvantages. Like a welded joint or an adhesively bonded rail joint of the prior art, the novel joint effectively locks the rail ends together so that essentially no relative vertical movement is permitted, thus effectively inhibiting rail end batter. As compared to adhesively bonded rail joints of the prior art, the novel rail joint is more convenient to install (the track crew need not mix or spread the adhesive), is operational within a shorter period (no waiting period for the adhesive to become thermoset) and is easier to dismantle (because it employs a thermoplastic adhesive which does not cure). Upon dismantling by heating the rails, one or both of the rails may be repaired or replaced and the joint remade without employing additional materials (providing the adhesive is handled so as not to become contaminated with foreign matter). Like the prior adhesively bonded joints, the novel rail joint may be electrically insulating and thus provide the insulated joints of an otherwise welded track.

The rail joint of the present invention comprises a pair of joint bars, each of which has broad faces shaped to conform to broad surfaces of the rails to be joined, including at least major portions of the surfaces underlying the rail heads and of the upper surfaces of the rail bases in the area of the rail joint. The broad faces of the joint bars carry thermoplastic adhesive layers, initially about 10–60 mils in thickness and preferably 25–50 mils in thickness which should permit reasonable dimensional variations in the rails and joint bars. The adhesive is characterized by:

a. modulus in tension of at least 200,000 psi at all temperatures from −20°F to 120°F, b. tensile strength (ASTM D 638–60T) of at least 2000 psi at all temperatures from −20°F to 120°F, c. sufficiently low softening point that it wets steel at less than 500°F under moderate pressure, preferably at 350°F or below, d. shear adhesion to cold rolled steel (ASTM D 1002-64) of at least 2000 psi at all temperatures from −20°F to 120°F, and e. water absorption of less than one percent, preferably less than 0.25 percent, after 24-hour immersion.

Thermoplastic adhesives of various chemical classes have proved to be useful, including Phenoxy-type polymers obtained by polymerizing equivalent amounts of bisphenol A [i.e., 2,2-(4-hydroxyphenyl)propane] and the diglycidyl ether of bisphenol A; polysulfone resins; amorphous-type polyesters such as Eastman Polyester GPRO(X11426); glass-fiber reinforced polypropylene such as "Profil" of Fiberfil, Inc. Ideally, the thermoplastic adhesive wets steel at 250°–300°F under moderate pressure and provides shear adhesion to cold rolled steel and tensile strength of 3000–5000 psi. It has been found that this ideal combination of properties can be achieved using commercially available adhesives only by adding modifiers to one of the above-identified adhesives. For example, this ideal combination of properties has been achieved by modifying a Phenoxy-type polymer having an average molecular weight of 20,000–30,000 and a glass transition temperature of about 100°C with any one of the following materials in amounts up to about ten percent of the weight of the modified adhesive:

1. A lower molecular weight polymer of bisphenol A and the diglycidyl ether of bisphenol A having a Gardner-Holdt viscosity of $Z_4$ to $Z_8$.
2. Polyglycidyl ether of bisphenol A having a Durrans' softening point of 95°–105°C and an epoxide equivalent of 870-1025.
3. Heat polymerized wood rosin having a softening point of 82°C.

In order to improve adhesion, a thermosetting resin coating may be cured in situ between the joint bar and the layer of thermoplastic adhesive. If desired, the rail surfaces after being cleaned and heated may be primed, for example, by spraying a thin coating of the same thermoplastic resin as on the joint bars, if desired including suitable anticorrosion, coupling and/or wetting agents. Because the thermoplastic adhesive does not cure, the joint bars of the novel rail joint can be later separated from the rails at any time by heating the rails above the softening point of the adhesive — even if the rails were primed with a thermosetting resin.

To assemble the novel rail joint, the rail ends may be preheated to a temperature at which the adhesive will wet steel under moderate pressure, after which the joint bars are positioned and fastened to the rail ends, usually with bolts extending through aligned bores in the joint bars and the rail webs. The heat from the rail ends causes the adhesive to flow under the pressure of the bolts, creating an adhesive bond that is sufficient for train operation as soon as the rails have cooled.

Because present rail joints require holes in the ends of the rails, it is convenient to employ bolts to assemble the novel rail joint. A boltless joint may be assembled using ordinary C-clamps which may be removed as soon as the rail ends have cooled. Preferably the C-clamps fit beneath the rails so that they can remain in place permanently, especially at curved sections of track or at any other locations at which the adhesive would be subjected to appreciable peel forces. By maintaining the adhesive under mechanical pressure through the joint bars, the adhesive is subjected primarily to shear forces.

Instead of bolts or clamps, one may employ any means suitable to apply moderate pressure to the thermoplastic adhesive, at least until the adhesive has cooled.

The novel rail joint may be made electrically insulating by employing electrically insulating joint bars such as glass-filament-reinforced resin of the type employed in U.S. Pat. No. 3,369,752. Preferably these are fitted with four bearing plate means as illustrated in FIG. 1 or in FIG. 3 of said patent such that there is no electrically conducting path from bolts in one rail to bolts in the other rail.

If desired, steel joint bars can be used in an electrically insulating version of the novel rail joint. To accomplish this, the adhesive (which itself is normally electrically insulating) should cover the fishing surfaces of the joint bars which are so shaped that they are safely insulated from the corresponding rail surfaces. Preferably, additional electrically insulating material such as resin-impregnated cloth is bonded over the fishing surfaces of the steel bars. If steel bolts are used with such a construction, they should be fitted with electrically insulating grommets. Because the adhesive bond effectively prevents movement of the rail ends relative to the joint bars, such grommets are subjected only to light forces.

In any electrically insulating rail joint, an electrically insulating end post is preferably positioned between the rails, but this is of less importance in the present invention because the adhesive bond restrains the rails from moving relative to each other.

THE DRAWING

Figure 1:
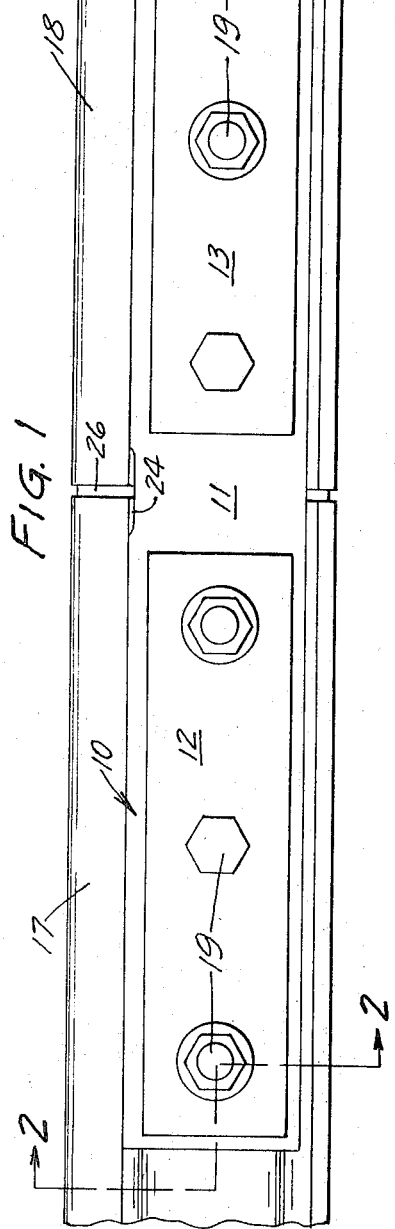
FIG. 1 is a front elevation of a preferred embodiment of the rail joint of this invention.
Figure 2:
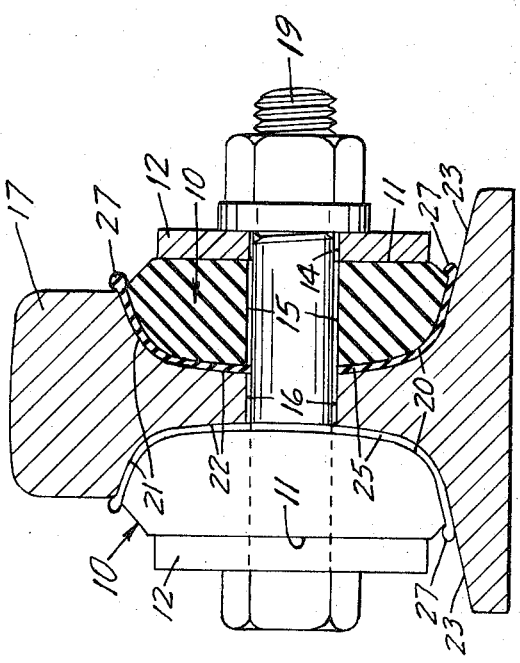
FIG. 2 is an enlarged elevation, partly in section, taken generally along line 2—2 of FIG. 1.

The joint bars 10 shown in FIGS. 1 and 2 of the drawing are constructed in the same manner as are the joint bars illustrated in FIGS. 1 and 2 of U.S. Pat. No. 3,369,752. Each joint bar is a laminate of a large number of thin layers of aligned bundles of glass filaments embedded in thermoset resin. One such layer of each joint bar provides a flat outer face 11 against which a pair of cast iron bearing plates 12, 13 rest. Each of the bearing plates 12, 13 has a bore 14 aligned with each bore 15 of the contiguous joint bar and each attaching hole 16 in the rails 17, 18 through which bolts 19 extend.

The inner face 20 of each joint bar 10 is machined to match the underlying surface 21 of each rail head, the surface 22 of each web and the tapered surface 23 of each rail base. A slight depression 24 (FIG. 1) is machined centrally in each joint bar 10 in order to provide clearance from the sharp corners at the ends of the rails 17, 18 which might otherwise cut into the joint bars under the weight of passing railroad equipment. Prior to assembly, a uniform layer of thermoplastic adhesive 25 is applied to the face 20 of each joint bar.

A major portion of the glass filaments of each joint bar 10 extend in the lengthwise direction of the joint bar, or if a substantial number of the filaments extend obliquely to the lengthwise direction, the lengthwise component of all of the filaments should exceed the transverse component. To insure adequate transverse reinforcement, the transverse component of all of the filaments preferably is at least one-tenth of the lengthwise component, which transverse component may be provided by a layer of transverse filaments every 100 mils or less through the thickness of each joint bar.

Sandwiched between the rails 17, 18 is an insulating end post 26 (FIG. 1) which may be formed of any durable, water-resistant, electrically insulating material in the shape of the rail cross-section. A laminate of layers of aligned bundles of glass filaments embedded in thermoset resin has been found to be particularly suitable.

To assemble the rail joint shown in FIGS. 1 and 2, the rail surfaces 21, 22 and 23 are thoroughly cleaned and the rail is heated to above the temperature at which the adhesive 25 wets steel under moderate pressure. The end post 26, joint bars 10 and bearing plates 12, 13 are then positioned, and the bolts 19 are tightened sufficiently to cause a bead 27 of the adhesive 25 to form around the full periphery of each joint bar. As soon as the adhesive has cooled, the joint is fully operational.

DESCRIPTION OF A SECOND EMBODIMENT OF THE INVENTION

Figure 3:
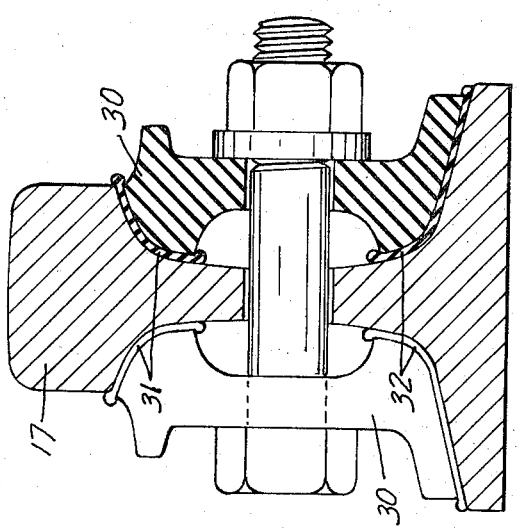
FIG. 3 is an elevation, partly in section, of another embodiment of the rail joint of this invention.

The rail joint illustrated in FIG. 3 is similar to that shown in FIGS. 1 and 2 and except that it employs a pair of steel angle bars 30 instead of the reinforced resin joint bars 10, each angle bar having two separated inner faces, each of which has been provided with a thermoplastic adhesive layer 31, 32.

EXAMPLE 1

Laminated plastic joint bars were constructed from sheets cut from a roll which had been made by drawing through a heated bath of epoxy resin and hardener a web of lineallyaligned bundles of continuous glass filaments, viz., 300 ends or bundles per inch of ECG 140's, 20 end roving, vinyl silane size. Each end included 204 glass monofilaments of about 0.00038-inch diameter. The epoxy resin was made from epichlorhydrin and bisphenol A and had a Durrans' softening point of approximately 30°–40°C, and the hardener was basically isophthalyl dihydrazide. After immersion in the bath of resin which was maintained at about 95°C, the web of glass was passed through squeeze rolls to densify and flatten it to a glass:resin ratio of 64:36 by weight and was then contacted with a disposable low-adhesion liner and wound therewith into roll form.

Eighty sheets cut from the web were stacked with 39 sheets cut from a second web which was identical to the first except that it was made using only 200 bundles per inch of the glass filaments. Every third sheet of the stack was cut from the second web and was laid up with its filaments crosswise to the filaments of the sheets cut from the first web. The whole was placed in a heated platen press which had been preheated to 120°C. Pressure was gradually applied over a period of eight minutes to 50 psi to give a thickness of 1 9/16 inches. After 2 hours in the press at 120°C, the cured panel was removed to an air-circulating oven where it was post-cured for 16 hours at about 138°C. After being cooled to room temperature, the panel was sawed and machined to provide a pair of joint bars 10 as illustrated in FIGS. 1 and 2 of the drawing, each 36 inches in the direction of predominant filament reinforcement and about five inches in the direction of the crosswise filaments. Six holes were drilled, each 1⅛ inches in diameter.

Selected as the thermoplastic adhesive was a polymer of equivalent amounts of bisphenol A and the diglycidyl ether of bisphenol A having an average molecular weight within the approximate range of 20,000 to 30,000 and a glass transition temperature of about 100°C. Such a polymer is commercially available from Union Carbide Corporation as "Phenoxy PAHJ". Two sheets of this adhesive of 30–40 mils thickness were shaped in a vacuum former at 120°C to conform approximately to the inner face 20 of each joint bar 10.

Before applying the shaped adhesive sheets, an adhesion-promoting coating was spread on each face 20 to a thickness of 10–20 mils. This coating consisted essentially of a mixture of a liquid epoxy resin and a room-temperature-reactive long-chain polyamine curing agent plus a filler comprising fifty percent by weight of the mixture. The epoxy resin was a polyglycidyl ether of bisphenol A having an epoxide equivalent of 175–210 and a little less than two 1,2-epoxy groups per average molecular weight. The filler comprised glass microspheres of 50 μm average diameter having an amino-silane finish to promote adhesion to epoxy resin.

The shaped thermoplastic adhesive sheet was progressively laid against the freshly applied adhesion-promoting coating so as not to entrap air, and sufficient pressure was applied in doing so to squeeze out about half of the epoxy resin mixture. Each joint bar and adhered thermoplastic adhesive sheet was placed in an oven at 120°C for two hours to cure the epoxy resin mixture.

To join two rails, the rail ends were cleaned by sandblasting and attached to a rail puller to maintain a spacing between the rails of about ½ inch. The rails were heated with a gas-fired welding torch until their temperature reached 400°F as indicated by a thermocouple held against the rail ends at several locations. The end post, joint bars and bearing plates were positioned and the bolts torqued to an initial pressure of 1,000 psi between the joint bars and rail ends, which pressure was sufficient to form a bead of resin around the entire periphery of each joint bar. After cooling, the rail puller was removed and the joint was ready for service.

The rail joint of this example has been in service on a main line of a railroad in the United States for about 8 months. In spite of heavy traffic at speeds up to 35 miles per hour, there is no indication of failure. Three similar experimental installations have been in use for somewhat shorter periods without failure.

We claim:

1. Method of joining two railroad rails comprising the steps of:
   a. providing a pair of joint bars having broad faces which conform to broad surfaces of the railroad rails including at least major portions of the surfaces underlying the heads and the upper surfaces of the rail bases in the area of the rail joint, which broad faces carry a thermoplastic adhesive of about 10–60 mils thickness characterized by:
      modulus in tension of at least 200,000 psi at all temperatures from −20°F to 120°F,
      tensile strength of at least 2000 psi at all temperatures from −20°F to 120°F,
      sufficiently low softening point that it wets steel at less than 500°F under moderate pressure,
      shear adhesion to cold rolled steel of at least 2000 psi at all temperatures from −20°F to 120°F, and
      water absorption of less than one percent after 24-hour immersion,
   b. pressing the adhesive-bearing joint bars against the broad surfaces of both railroad rails while heating the adhesive to a temperature at which the adhesive wets steel but not above 500°F, and
   c. cooling the adhesive below its softening temperature while maintaining the pressing.

2. Method of making a long-lasting but easily dismantled and reassembled electrically insulated rail joint between two railroad rails comprising the steps of
   a. forming a pair of electrically insulating joint bars, each having a broad face which conforms to broad surfaces of the railroad rails including at least major portions of the surfaces underlying the heads, the webs and the upper surfaces of the rail bases in the area of the rail joint, b. applying an adhesion-promoting thermosetting resin coating to each said broad face,
c. progressively laying a 25–50-mil layer of thermoplastic adhesive over each thermosetting resin coating and squeezing out sufficient of the thermosetting resin to ensure against entrapment of air, which thermoplastic adhesive is characterized by modulus in tension of at least 200,000 psi at all temperatures from −20°F to 120°F, tensile strength of at least 3000 psi at all temperatures from −20°F to 120°F, sufficiently low softening point that it wets steel at 350°F or less under moderate pressure, shear strength to cold rolled steel of at least 3,000 psi at all temperatures from −20°F to 120°F, and water absorption of less than one percent after 24-hour immersion, d. curing the thermosetting resin coating,
e. cleaning said rail surfaces,
f. heating the railroad rails to at least the temperature at which the thermoplastic adhesive wets steel under moderate pressure, but not above 350°F,
g. while maintaining an electrically insulating gap between the rail ends, pressing the adhesive bearing faces of the joint bars against said railroad rail surfaces across the gap between the rails with sufficient pressure to form a bead of the thermoplastic adhesive around the entire periphery of the joint bars, and
h. maintaining the pressure until the rail and thermoplastic adhesive have cooled.

* * * * *